US012333498B2

(12) United States Patent
Whitsitt et al.

(10) Patent No.: US 12,333,498 B2
(45) Date of Patent: Jun. 17, 2025

(54) SYSTEM AND METHOD FOR COORDINATING AND EXECUTING COMPLEX COMMUNICATIONS TASKS USING STRUCTURED MESSAGING AND OFF-LINE SYNCHRONIZATION

(71) Applicant: Squire Solutions, Inc., New York, NY (US)

(72) Inventors: Jeremy Brett Whitsitt, New York, NY (US); Terrance John O'Shea, Aiea, HI (US); David Andrew Grijalva, Vancouver, WA (US); Paul Daniel Ronan, Bend, OR (US); Steven Jay Lustig, Brooklyn, NY (US)

(73) Assignee: Squire Solutions, Inc., New York, NY (US)

( * ) Notice: Subject to any disclaimer, the term of this patent is extended or adjusted under 35 U.S.C. 154(b) by 281 days.

(21) Appl. No.: 17/977,088

(22) Filed: Oct. 31, 2022

(65) Prior Publication Data

US 2023/0148034 A1 May 11, 2023

Related U.S. Application Data

(60) Provisional application No. 63/276,614, filed on Nov. 7, 2021.

(51) Int. Cl.
*G06Q 10/10* (2023.01)
*H04L 67/12* (2022.01)

(52) U.S. Cl.
CPC .......... *G06Q 10/103* (2013.01); *H04L 67/12* (2013.01)

(58) Field of Classification Search
CPC .............................. G06Q 10/103; H04L 67/12
See application file for complete search history.

(56) References Cited

U.S. PATENT DOCUMENTS

| 11,978,558 B1* | 5/2024 | Drakos ................. G16H 50/70 |
| 2010/0166154 A1* | 7/2010 | Peters ...................... H04Q 3/66 |
| | | 379/45 |
| 2016/0036899 A1* | 2/2016 | Moody ................. H04L 67/141 |
| | | 709/217 |

OTHER PUBLICATIONS

USPTO Office Action, U.S. Appl. No. 17/021,403, Dated Oct. 13, 2022.
USPTO Office Action, U.S. Appl. No. 17/460,391, Dated Dec. 2, 2022.
USPTO Notice of Allowance, U.S. Appl. No. 17/021,403, Dated Jul. 19, 2023.
USPTO Final Office Action, U.S. Appl. No. 17/460,391, Dated Jun. 29, 2023.
PCT International Search Report, International Application No. PCT/US2022/049063.
PCT Written Opinion of the International Searching Authority, International Application No. PCT/US2022/049063.

* cited by examiner

*Primary Examiner* — Normin Abedin
(74) *Attorney, Agent, or Firm* — McGeary Cukor LLC; Vincent E McGeary

(57) ABSTRACT

A telecommunications system is disclosed that coordinates and executes complex communication tasks using structured messaging and off-line synchronization.

18 Claims, 10 Drawing Sheets

SYSTEM AND METHOD FOR COORDINATING AND EXECUTING COMPLEX COMMUNICATIONS TASKS USING STRUCTURED MESSAGING AND OFF-LINE SYNCHRONIZATION

CROSS-REFERENCE TO RELATED APPLICATIONS

This application claims the benefit of U.S. Provisional Application No. 63/276,614, entitled "System and Method for Coordinating and Executing Complex Communication Tasks Using Structured Messaging and Off-Line Synchronization," filed on Nov. 7, 2021, which application is incorporated by reference.

U.S. patent application Ser. No. 17/021,403, entitled "System and Method for Highly Efficient Information Flow using Natural Language Processing and Speech Recognition," filed on Sep. 15, 2020, is incorporated by reference.

U.S. patent application Ser. No. 17/460,391, entitled "System and Methods with a Multimodal Interface for Command and Control (Inputs) and Monitoring (Outputs) of Unmanned Systems," filed on Aug. 30, 2021, is incorporated by reference.

U.S. patent application Ser. No. 17/460,395, entitled "System and Methods with a Multimodal Interface for Command and Control (Inputs) and Monitoring (Outputs) of Unmanned Systems," filed on Aug. 30, 2021, is incorporated by reference.

FIELD OF THE INVENTION

The field of the invention relates generally to the field of deploying networked resources to accomplish complex tasks requiring highly coordinated actions in stressful environments, and more specifically to robust on-line and off-line systems for command and control of resources using multimodal interfaces, structured messaging and event synchronization.

BACKGROUND

Operational tasks that depend on actionable information inputs from human components (e.g., a pilot for an aircraft) often pose significant challenges, delays, and in some cases life-threatening risks that stem from poor information flow and poor data flows. Such instances are prevalent across most, if not all, industries including both private and commercial sectors. For example, during a tactical operation, such as emergency medical response or perhaps a time-sensitive military or law enforcement operation, information overload affecting key individuals and information chokepoints prevent actions during mission-critical moments. As a result, inefficient information flow and related requirements can cause delayed actions and, in some cases, cost lives.

For example, a delayed Medical Evacuation or "MEDEVAC" helicopter launch, a delay for a backup unit to arrive on scene, or perhaps a delay for a doctor to arrive at the emergency room, may mean the difference between life and death. Especially during high-risk operations, such information chokepoints become amplified during time-sensitive situations, as do the resultant adverse effects and negative consequences. Operational workflows virtually always involve some form of human-to-human communications, which can be a large contributing factor regarding information chokepoints.

Regardless of any training an individual may have, or the equipment in use, human-to-human communications typically involve numerous shortcomings, especially during emergent situations. Examples include a higher potential for human error with each transmission or re-transmission, time-delays due to redundancies in communicating pertinent information, or some combination of both, particularly when communicating information via lengthy prescribed channels (i.e. having to relay through some human intermediary such as a 9-1-1 dispatcher, an aircraft overhead, or military headquarters, etc.) versus communicating directly with the end-user of that critical information. Moreover, human factors and technological (or communications) limitations increase risk to personnel due to increased cognitive overload on key individuals, as well as a lack of situational awareness (e.g., a pilot that loses focus on flying the aircraft because the pilot is instead focused on attempting to reach Air Traffic Control on the radio).

Another example might occur during a special operation, when a medic loses focus on a patient because the medic is instead focused on re-transmitting information over the radio (perhaps due to a poor radio or signal connection). In the example of a MEDEVAC scenario, among other similar situations, such information is required before other phases of a workflow can occur (e.g., information must be received before a MEDEVAC helicopter can takeoff from the base). Again, similar problems exist across various industries, in general, and while every situation may not be time-sensitive or life-threatening, poor information flow causes significant problems (e.g., a manufacturer does receive essential information in time to shut down an assembly line to prevent injuries, or avoid costly production errors, and so forth).

Complex tasks typically require multiple coordinated stages and various resources which may need to be dynamically allocated. For example, a medical evacuation task can include a request for the evacuation helicopter, allocating the evacuation vehicle and other resources to accomplish the evacuation, selecting a destination for the evacuee, flight, pickup, return flight, and post-operation reporting. In a technologically austere environment, such as a mountain rescue, communication may be limited to satellite phones, HF/VHF/UHF radios, or SATCOM radios used as digital modems that must enable beyond line of sight (BLOS) communications. Such communications may be highly noise filled, and subject to interference, and the robustness of the system solution may be limited by bandwidth constraints.

In many cases, the communication network is ill-defined, at best a series of star networks with relays at the center of the hubs. Each element within the networks contains a computer platform capable of processing, storing and forwarding messages. Such a distributed network suffers from coherence data consistency issues. Moreover, fully formed networks may not be available at all in certain geographic regions, or may lack optimal redundancy and reliability necessary for operations where lives are at stake. Available communications and coordination tools useful for coordinating complex tasks among many resources requiring dynamic and seamless activation are typically designed to run on cloud-centric and highly persistent networks with little or no bandwidth constraints.

The lack of robust networks with consistent cloud accessibility presents a particular problem for voice interfaces, which typically rely on cloud resources. Voice assistant interfaces typically require very large and complex voice interaction models. Accuracy requires large storage, CPU cycles and other processing power. In a highly complex task with multiple resources requirements, accuracy is critical.

Where lives are at stake, even a small inaccuracy in a voice translation can be catastrophic. Moreover, voice assistants as usually deployed operate to the exclusion of other interfaces running concurrently.

There is a need therefore to provide communication and coordination solutions in environments where traditional communications and even advanced network or cloud-based systems fail to provide the robustness necessary to adequately address the aforementioned shortcomings. In high demand environments such as military environments, there is a need for faster, more reliable and accurate communication systems that reduce cognitive loads on the actors, that maintain coordinated event history across multiple nodes even when cloud communication is unavailable, and that enables hands-free coordination of complex tasks. Such a system should have robust off-line capability, a hands-free multi-modal user interface capability with voice, operate in low bandwidth or constrained networks, and service mobile elements, hubs and cloud-based resources.

SUMMARY

Systems and methods according to the principles of the invention overcome these and other shortcomings. An exemplary system can include multiple mobile units, such as mobile phones, laptops, tablets, or other processing devices with transceiver capability. The system can also include stationary units such as command centers having in-place computers and servers that have communication links to the mobile units. The nodes are in cloud communication with a log server and with one or more databases. Nodes need not have consistent communication with the log server or the databases. One or more nodes may include physical resources such as manned or unmanned vehicles. Special purpose programming for implementing aspects of the invention execute on the nodes.

The nodes, servers and databases when executing the special purpose software carry out the methods of the invention. Preferably, such special purpose software includes software for implementing workflows, sending and receiving structured messages according to the workflow, carrying out off-line synchronization, and providing multi-modal interfaces having hands-free capability such as voice interface. In another aspect, the command centers include a graphical interface having the capability to provide text communications from nodes, to show available resources, to drill down on data at various nodes, to send messages to nodes, to create exceptions to actions to carry out various other oversight and command center functions.

For any given task or sequence of related events, logically organized as a workflow, an exemplary system achieves ultimate state consistency across network nodes although one or more nodes may transact off-line for some or all of the sequence of events. Nodes can communicate and transact directly without consistent access to a cloud-based database. The exemplary system implements a message-oriented design where messages carry data and logic. Each node maintains a record or log of its transactions, such as messages sent and received and synchronizations with other nodes, in a particular workflow. The synchronization method maintains a log of events associated with all the messages and events in particular workflow or task. The synchronized log operates as the centralized authority of states in the network. A synchronization method serves to synchronize states across all the nodes and the database according to the log. In an aspect of the invention, the synchronization methods execute mutation-based synchronization with vector clocks.

An exemplary use case for a medical evacuation follows workflow. Land-based rescuers carry mobile units executing a multi-modal interface according to the invention. The rescuers reach a person in need and perform an on-the-ground assessment of the medical condition. A rescuer using a voice interface instantiates a rescue workflow. The mobile unit provides a user interface and the user completes a request for airborne rescue form that the mobile will translate into a structured message. To provide location, the rescuer taps a map point provided by the mobile's GPS system. The rescuer uses the mobile's camera to photograph injuries and using voice interface attaches the photos to the request form. Using the multi-modal interface, the rescuer determines that a drone is nearby and available. The rescuer initiates another workflow and commands the drone to take a series of aerial photos showing the rescue mission and surrounding location. The rescuers send the request message as a broadcast or as an addressed message to identified recipients. The message is a structured message carrying the assembled data and whatever necessary metadata and logic receiving nodes may require to respond to the request.

A command center or hub overseeing the area of the rescue views a map having icons indicating the rescuers. The command center preferably receives all messages from all nodes in the workflow. The command center receives status of resources within its command zone or geographic area. The command center receives the request for action and via the interface can view the form and the associated data. Medivac helicopters also receive the request and one or more respond with their availability and estimated time of arrival as per the workflow definitions. The command center operator selects a resource based on ETA and on-board capabilities. The command center operator also notes that a hospital in the area has availability, and directs the helicopter to use one of them as the destination hospital. These messages are logged and synced across all nodes.

The designated hospital reviews the action request and notes that it lacks a particular blood type that may be necessary. The designated hospital creates an exception while the helicopter is flying to the rescue site. The command center operator designates a second hospital and the destination hospital acknowledges. The rescue is completed. The foregoing actions and messages are part of the workflow design, and structured messages carry the necessary data and logic to the nodes.

Each node in the above use case logs its messages sent and received. Either on the fly, if the node has cloud access, or at a later time when the node connects to the cloud resource, the events from the nodes are synchronized to the central log server. The central log server syncs to a database, where the log has authority over conflicts. In an after-action assessment, operators use the log and the database to take state views from each node during the use case.

In an exemplary system, the workflow defines the logical coordination of resources via actions to be taken. The nodes communicate with each other using structured messaging according to the principles of the invention. Structured messages embody data and logic a system element may take. The elements of the network execute functions for ingesting data, interpreting structured messages, authoring structured messages, synchronizing states and other actions necessary to carry out events.

The network elements are equipped with computing devices having processing units, input and output systems, memory, storage, operating systems and general and special purpose software for executing computer programs and for carrying out data communications with other nodes. These elements include mobile devices, cloud-based servers, manned and unmanned vehicles, and hubs.

The special purpose programming, including a message framework for generating and interpreting structured messages for a workflow, resides on the network elements. The message framework provides functional capability for authoring workflow messages, interpreting workflow messages and interacting with the device's on-board resources. The message framework also includes a synchronization engine for executing on-line or off-line synchronization. Workflow messages are structured messages embodying data and logic. A context provider receives queries for data and relays queries to available resource for the requested data. The message framework includes binds to the user interface layer to provide data from which the device layer can generate interface elements for providing required data.

DETAILED DESCRIPTION

Figure 1:
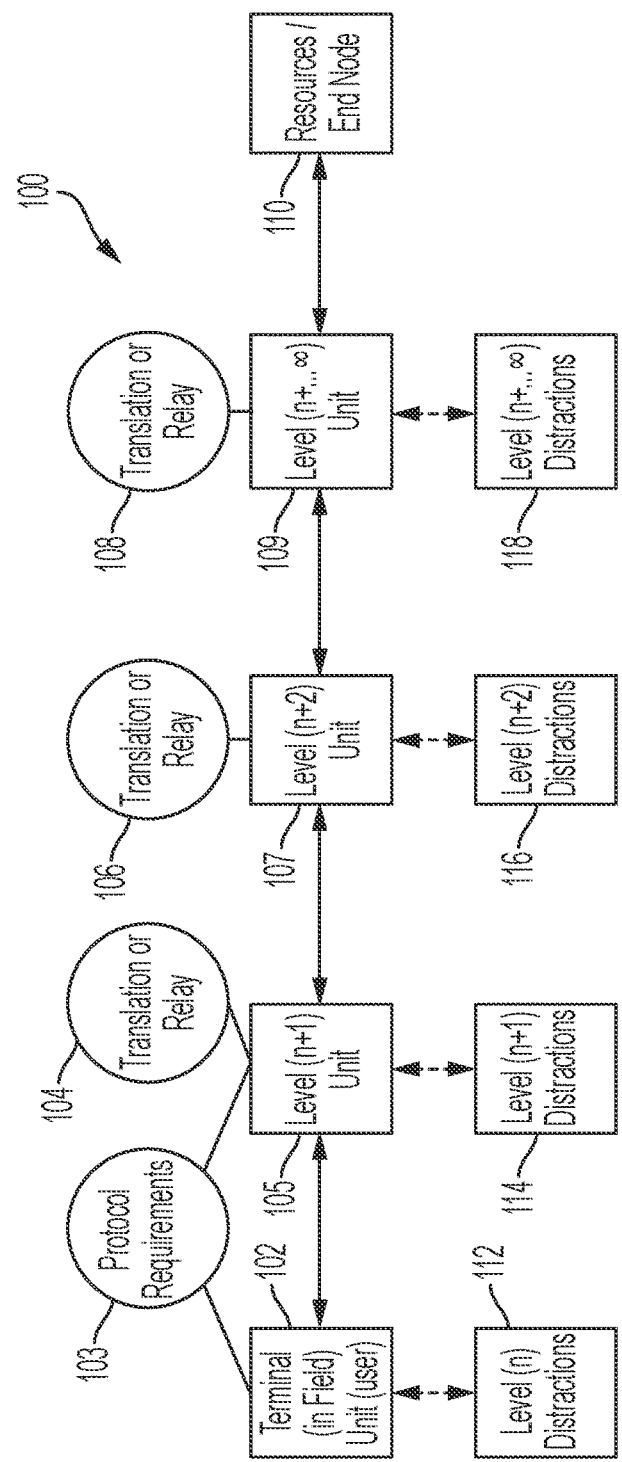
FIG. 1 shows a prior art system for deploying medical evacuation helicopters.

FIG. 1 shows a prior art system and method 100 for deploying medical evacuation helicopters. It depicts information flow in the context of a MEDEVAC scenario, as it may typically occur during military operations. In the field, users 102 at a field event require medical assistance, including a medical evacuation helicopter. The users gather the information required to make such a request according to MIST/9-Line protocols. MIST/9-Line protocols embody formal protocol requirements 103 relating both to content of a communication and the formalities of the communication. The users may gather such information using notes or otherwise gathering the necessary data. The users make voice contact to translation or relay point 104 via a communications link such as a satellite link. In a voice-to-voice communication a human at 104 gathers the MIST/9-Line information and translates the information to a MIST/9-Line document. The translation or relay point relays the MIST/9-Line through a chain of relay points 106, 108 to the resource end point 110, in this case a medical evacuation helicopter. The helicopter 110 responds based on the received information.

As can be seen from the above, each step in the communication link introduces potential error, and the communication must traverse multiple levels. The users gathering information and using voice to transmit vital information to the administrator may be distracted by their environmental conditions, including potential enemy fire 112. The initial translation 104 may introduce error. The communications chain also introduces delay and error at each level of communication where additional level specific distractions 114, 116, 118 may upset the information path. The shortcomings of this prior art system also exist in other non-military scenarios such as rescue operations.

Figure 2:
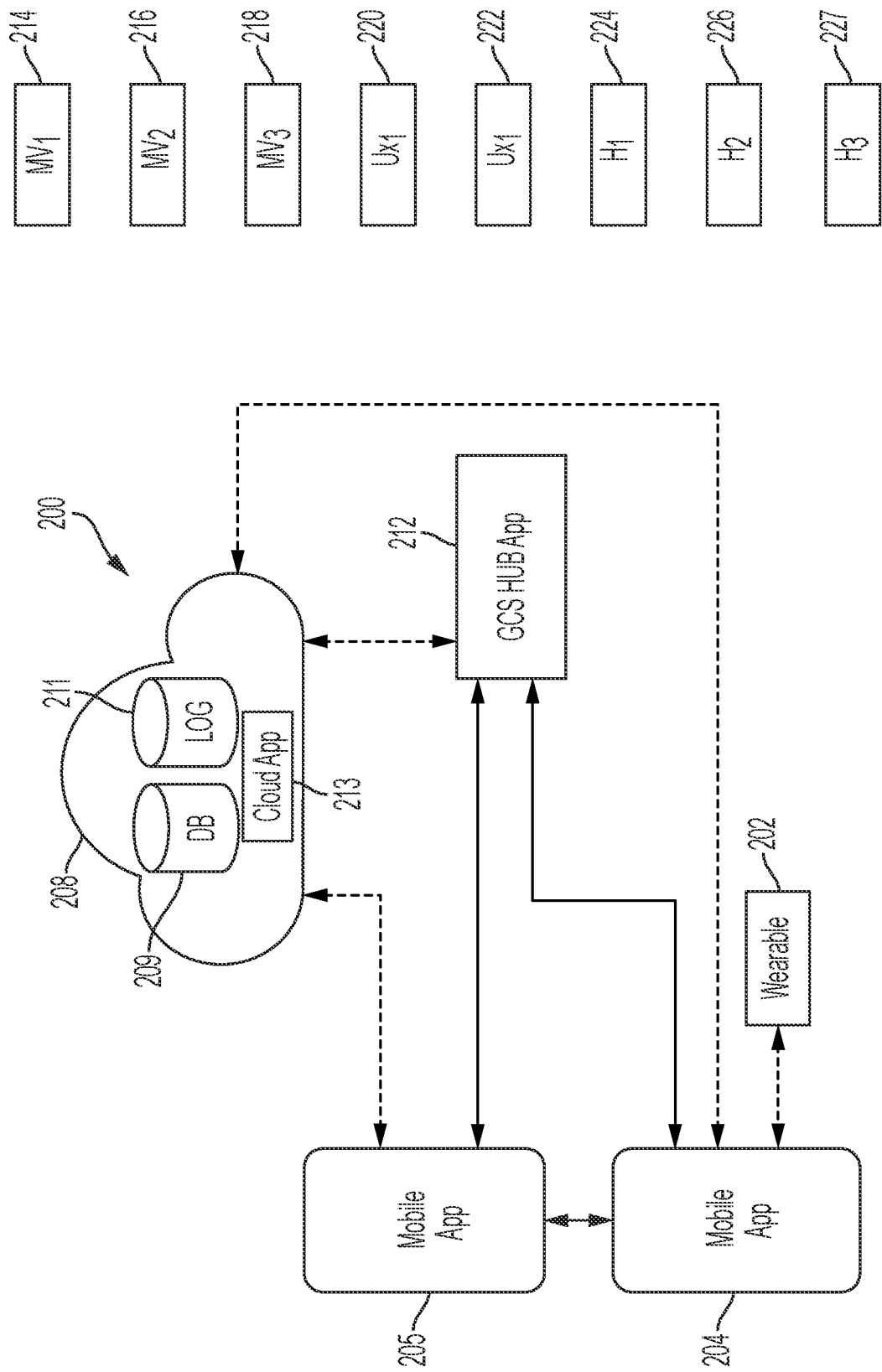
FIG. 2 shows an exemplary system diagram which can be implemented according to the principles of the invention.

FIG. 2 shows an exemplary system diagram 200 which can be implemented according to the principles of the invention. The communication links can be wired or over-the-air or both. As will be understood by the person of ordinary skill in the art of networked communications, the communication links can rely on various networking protocols, including packet networking protocols, and network security implementations.

In the illustrated configuration of the system 200 multimodal inputs come from a wearable 202 and a smartphone platform 204. The wearable 202 is in radio communication with the smartphone 204, although the wearable could be in direct communication with other elements or nodes of the system 200. An additional mobile 205 is in communication with mobile 204. Additional mobiles may be present but are omitted for clarity. The mobiles are in intermittent communication with the cloud 208. The cloud 208 includes a database 209 a log 211 which together store all the state data for all the nodes in the system 200 for a given workflow. Special purpose programming referred to as Cloud App 213 executes processes for carrying out the methods of the invention as will be explained.

A ground-based command center serves as a stationary hub 212 and is in communications with mobiles and resources 214-228. The GCS runs Hub App as will be explained hereafter. The GCS executing Hub App carries out critical services that may otherwise be service from the cloud 208. The mobiles are in direct communication with the GCS. More than one GCS can be provided.

The resources include unmanned vehicles 220 and 222, medical evacuation helicopters 214-218, and hospitals 224-228. Other resources can be included such as local law enforcement and local rescue resources. These resources communicate with the command center 212, with the cloud 208 and optionally with each other. Optionally the manned and unmanned vehicles are embedded with special purpose programming for participating in workflows as will be described.

The exemplary system further includes at least one database 209 and at least one log resource 211. While the exemplary system shows a dedicated database and log server on the cloud, a person of ordinary skill in the art will understand that the database and log may be implemented in various configurations, and that the functionality can be distributed across various elements. The database stores, among other things, the data created and exchanged across the nodes according to workflows as that construct will be explained below. Further, the events are logged such that records of all the events at each node for a workflow exist in the log.

The elements of this exemplary system 200 can be referred to as elements or nodes or resources. A person having ordinary skill in the art having read this disclosure will understand that the system can include additional networked elements and the number and types of illustrated user devices, unmanned machines and other elements is not limited. Likewise, the invention can be deployed in different network topologies and use various communication links and protocols, such as wired protocols. Similarly, a network according to the principles of the invention can support stations, such as desktop devices, point of sale device or embedded systems which may execute a message framework as will described.

A person having ordinary skill in the art having read this disclosure will understand GCS can also have communication with the human control devices 202 and 204, that the human control devices can be a gesture device, a voice control device, a joy stick or any controller the user may desire as further discussed in this disclosure. The input devices of system 200 are merely illustrative.

A person having ordinary skill in the art having read this disclosure will understand that the nodes of exemplary system 200 are equipped with computing devices having processing units, input and output systems, memory, storage, operating systems and general and special purpose software for executing computer programs and for carrying out data communications with other nodes. A person of ordinary skill in the art after having read this disclosure will understand that the system 200 according to the principles of the invention can be implemented on the described nodes as special purpose programming and may take advantage of existing functional modules.

Figure 3:
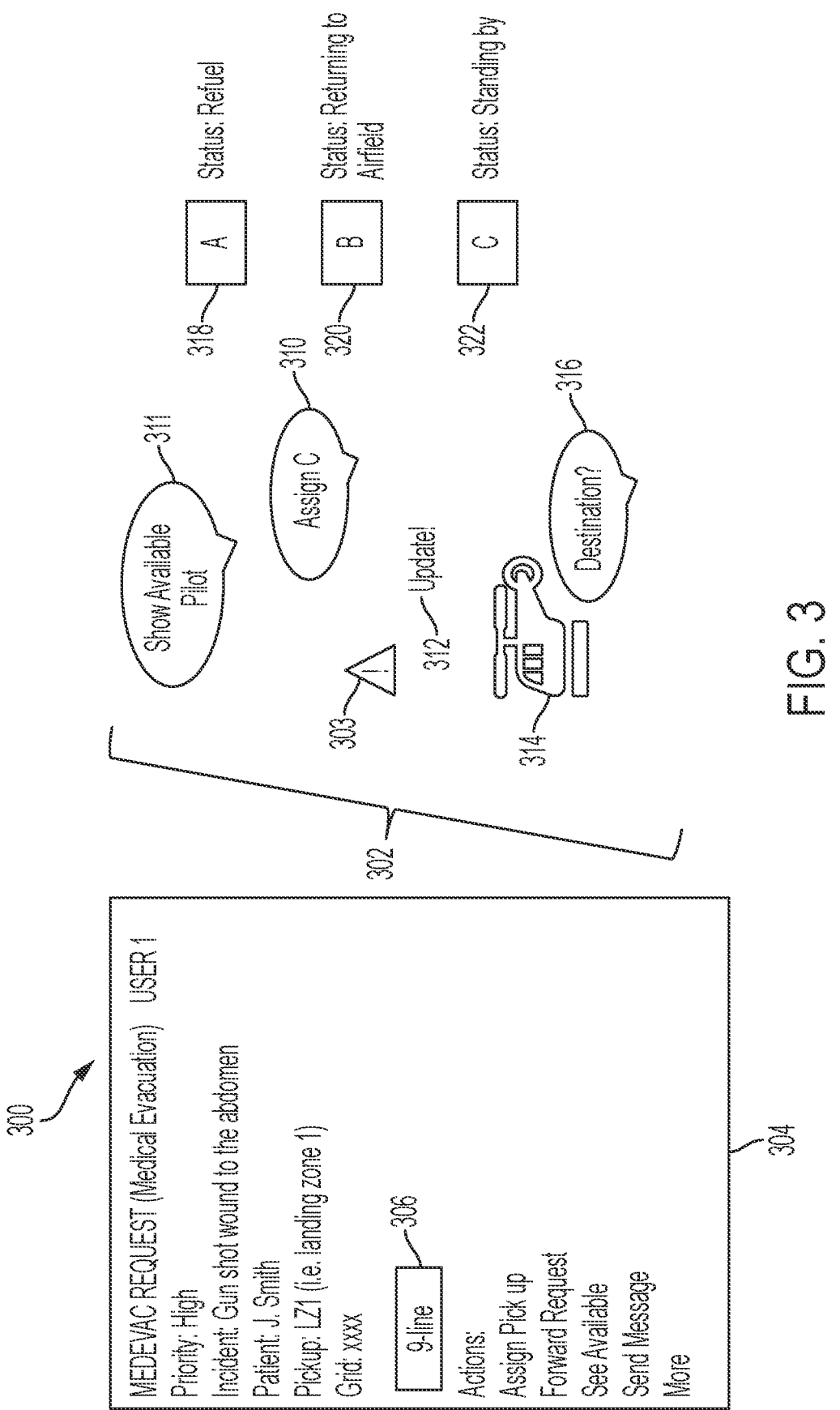
FIG. 3 illustrates an exemplary command center output screen.

FIG. 3 illustrates an exemplary command center output screen 300 which may form a part of a user interface. The contemplated use case involves a remote rescue requiring a medevac helicopter. The screen shows a map 302 locating the rescue effort 303 and various icons indicating resources and data pertinent to the operation. Message 304 from the rescuer requests a medevac and attaches a request report such as a MIST 9-Line 309. The rescuer prepares the request, the form and the associated files according to the principles of the invention. As such, various nodes on the network receive the request at or near the same time as the command center operator. On the screen 300, the operator can activate the message 304 icon to view the full request form or to view the attached data 309.

The screen 300 indicates potential actions in the workflow. The user selects SEE AVAILABLE using the voice interface as at 311. The screen displays medevac helicopters A, B and C 318-322 together with their respective status. These displays can be the result of messages received from the medevac helicopters indicating availability and willingness to respond. The command operator uses the voice interface to select C as at 310. The screen updates 312 and shows helicopter C 314 on the way to the site. The system queries the command operator audibly for a destination assignment at 316.

The command operator can now request available hospitals and the screen with update with available hospital resources. The operator assigns a hospital and communicates the selection on the network. Optionally the workflow may include logic for the selected hospital to indicate an exception to the assignment. For example, the hospital may determine that is lacks the resources necessary for the rescue, such as having a plasma or blood shortage of the appropriate type. The logic can provide the operator with a user interface for acknowledging the exception and selecting another available hospital. These and other functions can be provided for in the workflow and with the exchange of structured messages according to the invention this task can proceed in a highly coordinated and dynamic process.

A person of ordinary skill in the art after having read this disclosure will understand how to implement the illustrated use case on a network that lacks consistent cloud connectivity without losing state consistency among the nodes. The nodes in a system according to the principles of the invention need not maintain consistent cloud communication. In a system according to the principles of the invention, the user can implement voice interface without consistent cloud connectivity.

Figure 4:
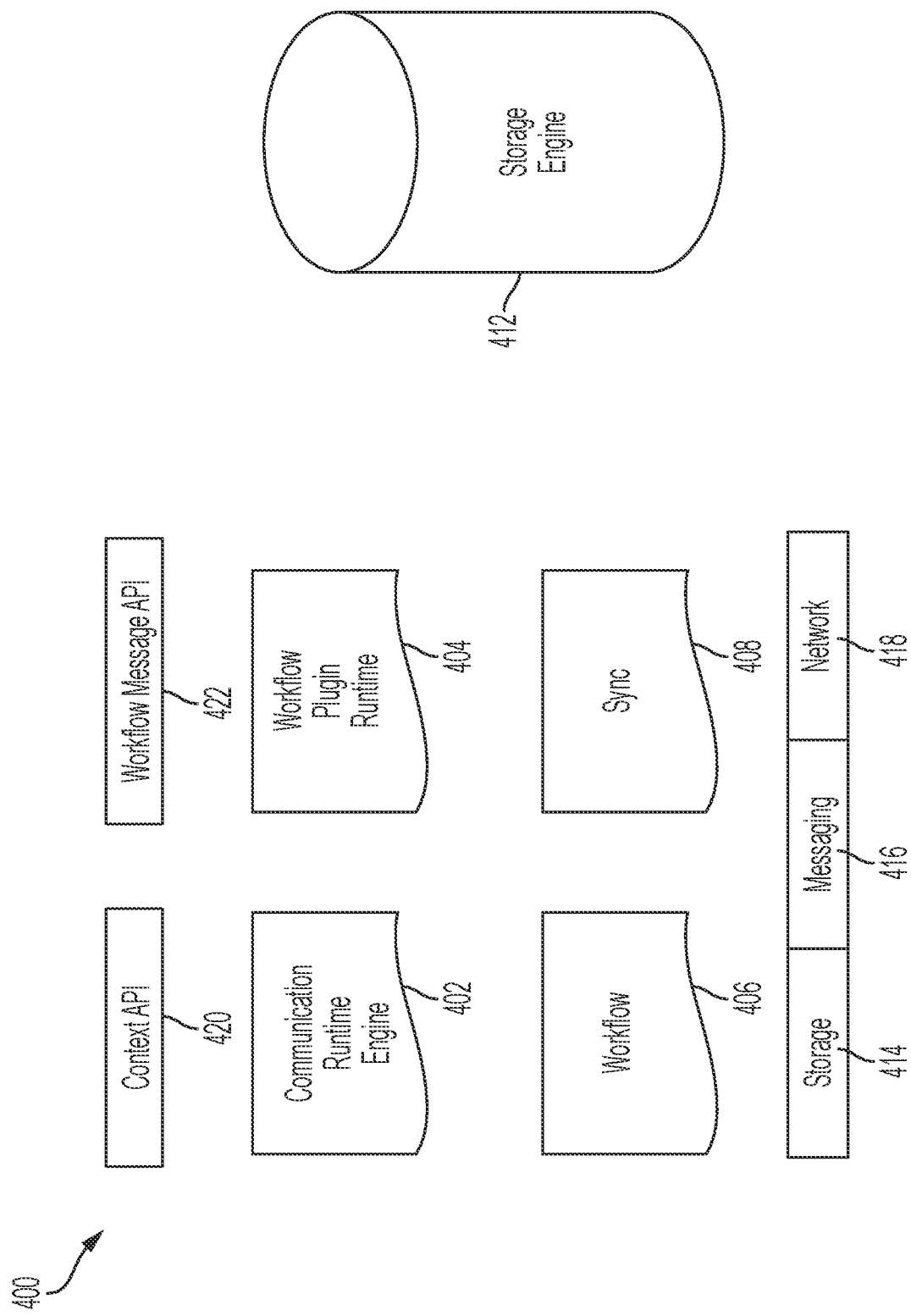
FIG. 4 shows a logical block diagram of an exemplary message framework.

In an exemplary embodiment, the elements of network 200 provisioned according to the principles of the invention embody special purpose programming referred to here as a Message Framework or MF. FIG. 4 shows a logical block diagram 400 of an exemplary MF. The MF can logically be considered a part of the communication stack of a device. It is a set of shared libraries that manages and executes the synchronization of messages, state, and logic, as will be explained below.

This example MF illustrates process engines 402, 406, 408 and storage engine 412. These engines carry out the basic core processes of the MF. Storage engine 412 executes the processes for storing and retrieving data from local storage. This includes all state data, sync processing data, log and configuration. The synchronization engine 408 provides the processing for synchronizing state across network elements as will be more fully explained below. The communication engine 402 provides the processes for packaging messages and handling received message. It can interface with local resources via the messaging and network bindings. Workflow engine 406 stores workflow definitions and core workflow process. The workflow plugin 404 executes workflow process per the specific workflow under execution.

The storage binding 414 provides access to the on-board storage of the device so that the storage engine 412 can write to and read from the on-board storage. The messaging binding 416 gives the MF access to the local resources for reading or writing messages, or for processing particular message protocols. The network binding 418 provides the MF access to the resources necessary to send and receive networked messages, as would be understood by the ordinarily skilled artisan in networked communications. The operation and implementation of these and other bindings will be apparent to the person of ordinary skill in the art.

Likewise, the exemplary MF includes a context API and a Workflow Message Authoring API. The context API 420 provides access to a context data provider, such as location data from a device GPS. The operation and function of the context API 420 will be explained below. The Workflow Message Authoring API provides access to the device interface layer. As will be explained, a workflow includes data from which a device can generate user interface elements. This API 422 interfaces this aspect of the MF functionality to the device interface layer and provides the interface layer with metadata the device interface can use to generate forms, prompts, voice interactions and other interface items as may be configured.

Figure 5:
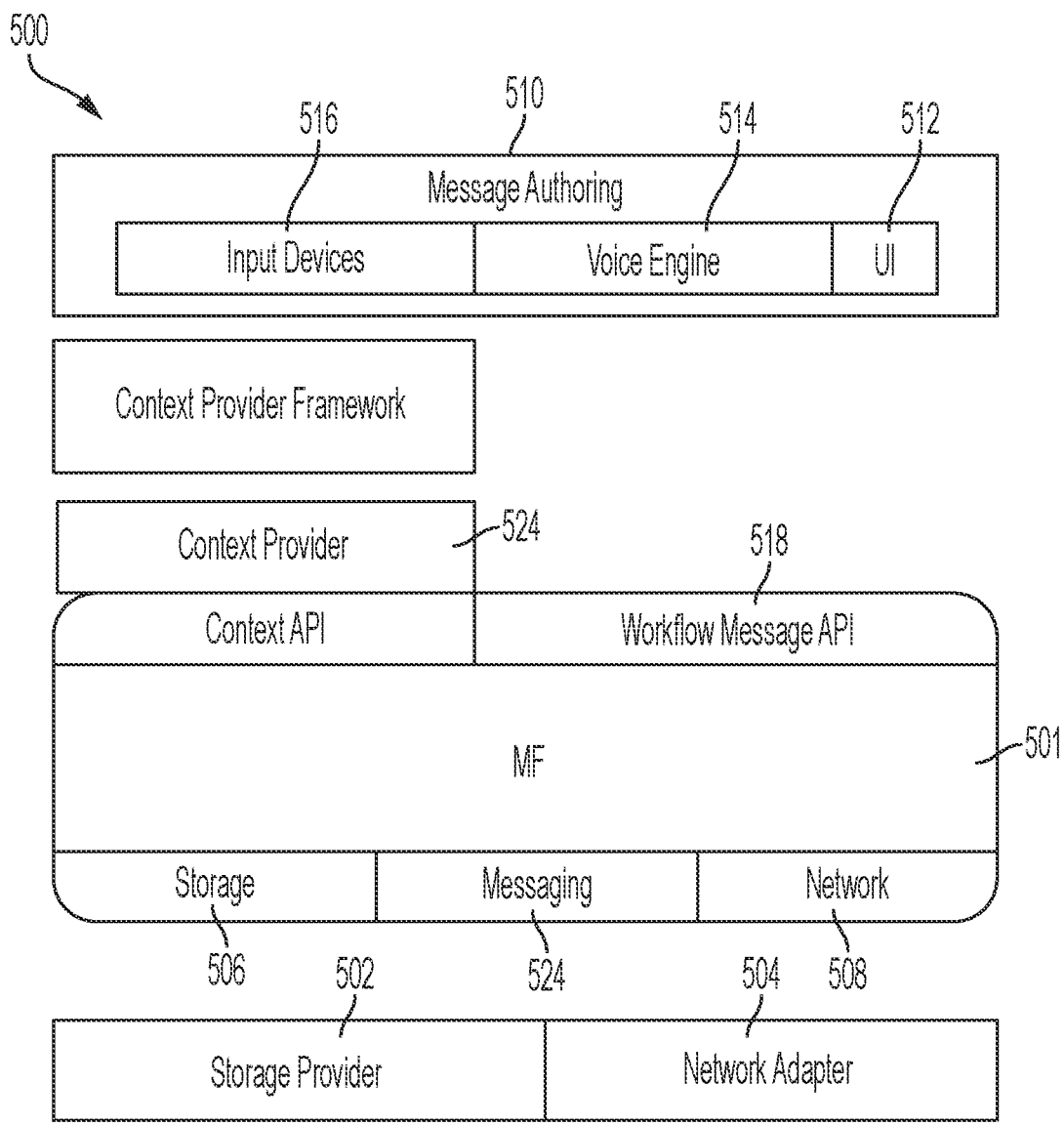
FIG. 5 shows a logical diagram for an embodiment deployed in a mobile device.

FIG. 5 shows a logical diagram 500 for an MF 501 deployed in a mobile device such as a device executing the Android OS. Such a mobile device can be provisioned as a mobile element in the exemplary network 300 of FIG. 3. This exemplary MF connects to the device's storage 502 and networking 504 capability via the storage 506 and network 508 binding. Message authoring 510 has access to the voice engine 512, UI 514, and input devices 516 such as touch screen, hard buttons and the like, and builds messages using data derived from structured messages via the workflow message API.

The context API 520 communicates with the Android OS context provider 524 and context provider framework 526.

The context framework provides data from the on-board sensors, data in other applications and whatever device context data may be available as equipped and configured. The use of context provider data is explained further below. The workflow API 518 with the app allow presentation data, data acquisition or modification of the WASM workflow engine. The messaging interface 524 provides access to messaging resources such as may be necessary to interpret or format messages according to the OS requirements.

Figure 6:
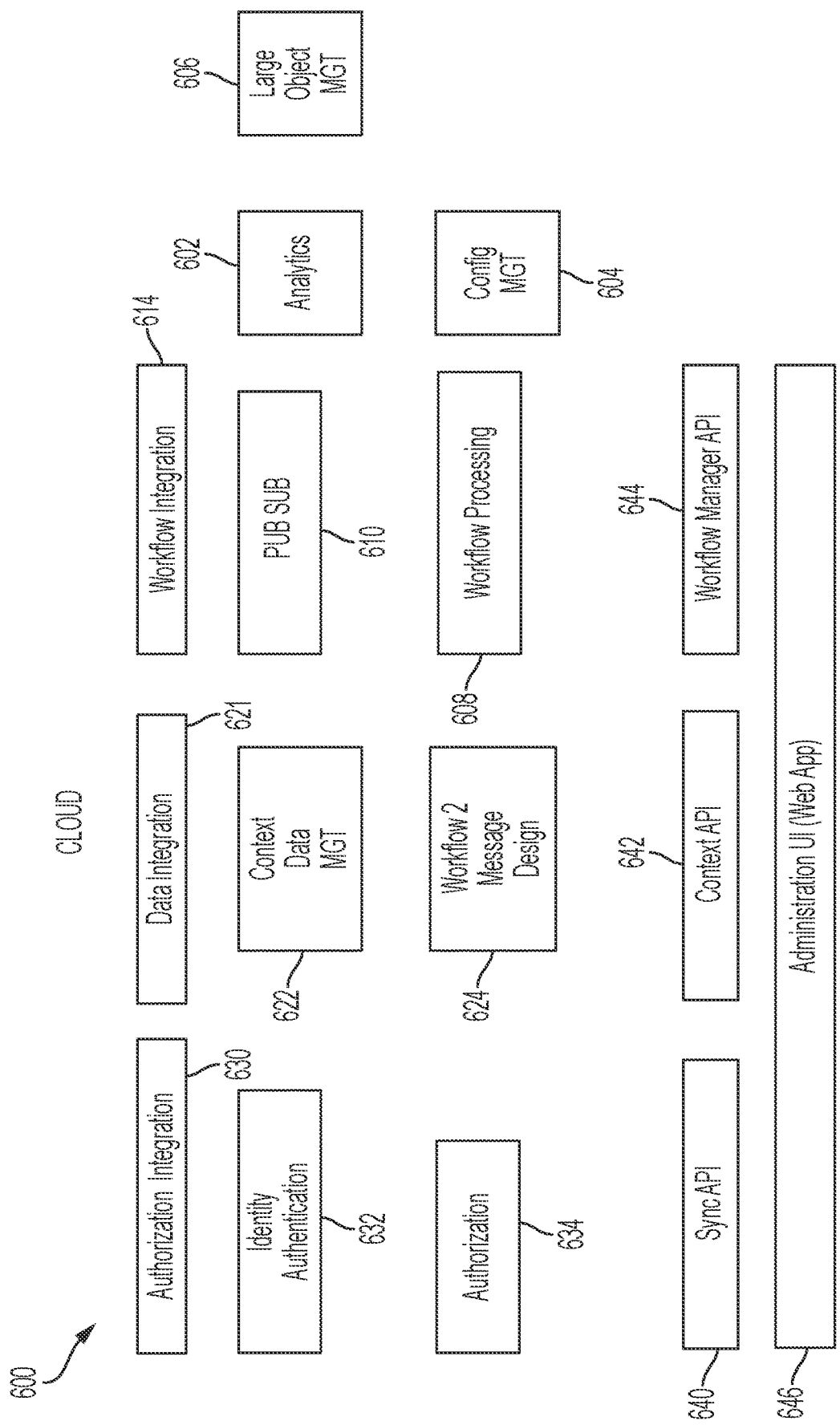
FIG. 6 shows an exemplary block diagram of an embodiment deployed in a network cloud.

FIG. 6 shows an exemplary block diagram 600 of a Cloud App. Cloud App can reside in any place above the primary level of the base of the network. The logical functions of the MF in Cloud App need not be implemented as a single application but can be implemented in a number of applications or modules. The logical functions can be distributed. The MF in Cloud App when deployed is the final repository of data for both on-line and off-line nodes.

In this exemplary embodiment, Cloud App performs centralized services and coordination. Large scale processing such as off-line analytics 602, configuration management 604 and large object (eg, video) management 606 can take place in Cloud App. Workflow Integration 614 is processed in Cloud App. This includes workflow processing 608 where logs of messages from on-line and off-line nodes participating in a workflow collect and where the data from such nodes collects in a database. Cloud App resolves any conflicts and holds the authoritative synchronization record. In this embodiment, workflow can be propagated in a publication/subscription mode (pub sub) 610, which can be managed from Cloud App.

Cloud App can provide the highest level of data integration 621 with existing systems and resources 620. This includes context data management 622 and workflow authoring and message design 624 as will be explained more fully below.

This embodiment includes authorization integration 630 in Cloud App which integrates any existing authorization and authentication that may already exist on the systems on which the MF is deployed. Identity and authentication 632 and authorization 634 can be processed in Cloud App. An admin user interface 640 is included to access the functional modules.

Figure 7:
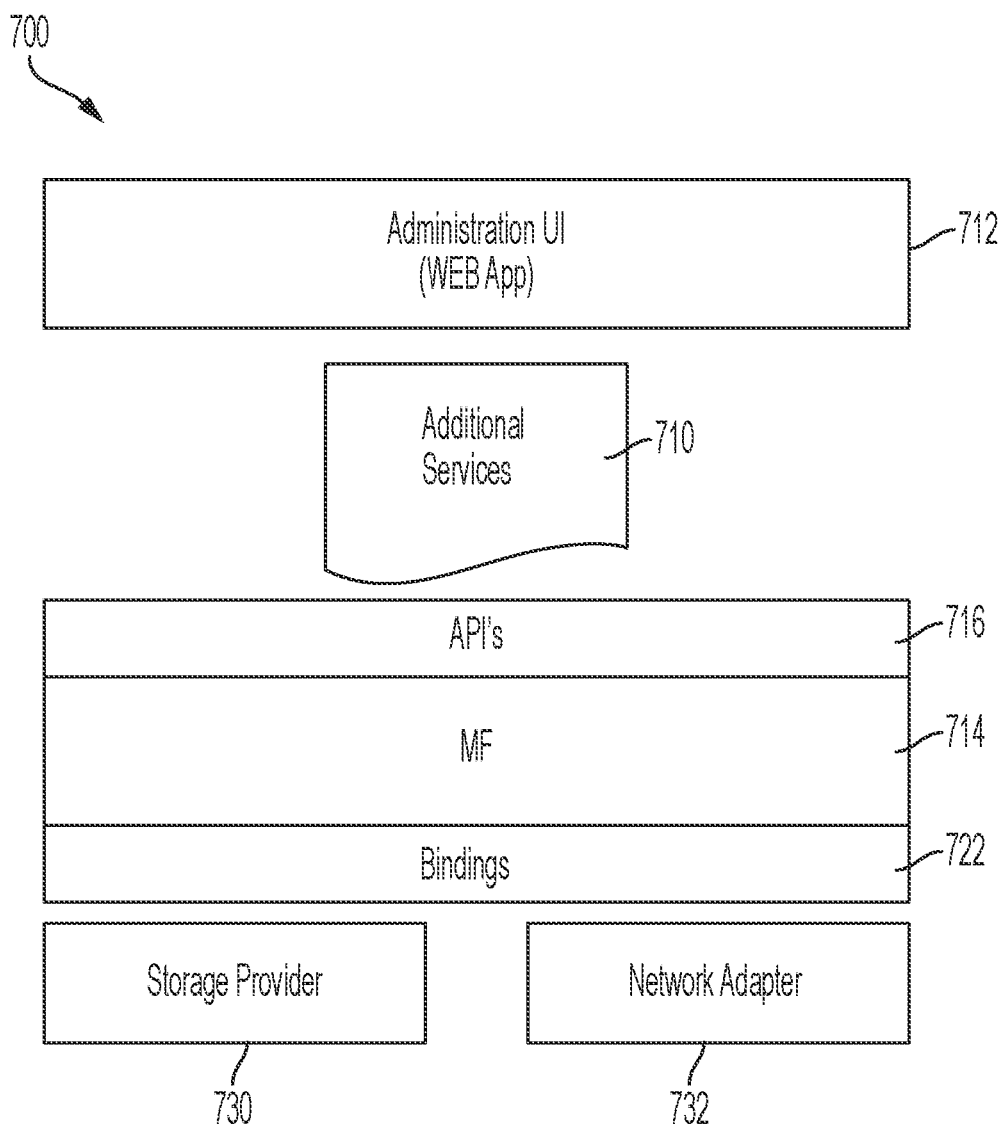
FIG. 7 shows a block diagram of an embodiment implemented as a hub.

An administration user interface 646 is provided as a web application. Optionally or additionally a local user interface access can be provided. APIs 640-644 provide interfaces to synchronization data, context data providers and a workflow manager 644. The workflow manager 644 can provide oversight and administrative access to the various workflows processing on the Cloud App, FIG. 7 shows a block diagram 700 for a MF executing as a hub station or other type aggregation point, referred to here as Hub App. This embodiment can be considered as an on-premises skeleton version of the Cloud App with somewhat reduced services or other additional services 710, such as data aggregation or on-premises additional security. A hub can perform functions essential to the workflow, and message passing while remaining as a headless (no I/O—embedded) lightweight version of the Cloud App. An administrative UI 712 deployed as a remote web application is used to service, install and provision the hub. The MF 714, context and workflow APIs 716, and storage, message and network bindings 722 function as previously described. Storage 730 and network adapter 732 represent the storage and network interface resources, respectively. The Hub App can be deployed, for example, in local data centers, in vehicles or anywhere Cloud App may not be available, may not be required, or may require additional services.

Figure 8:
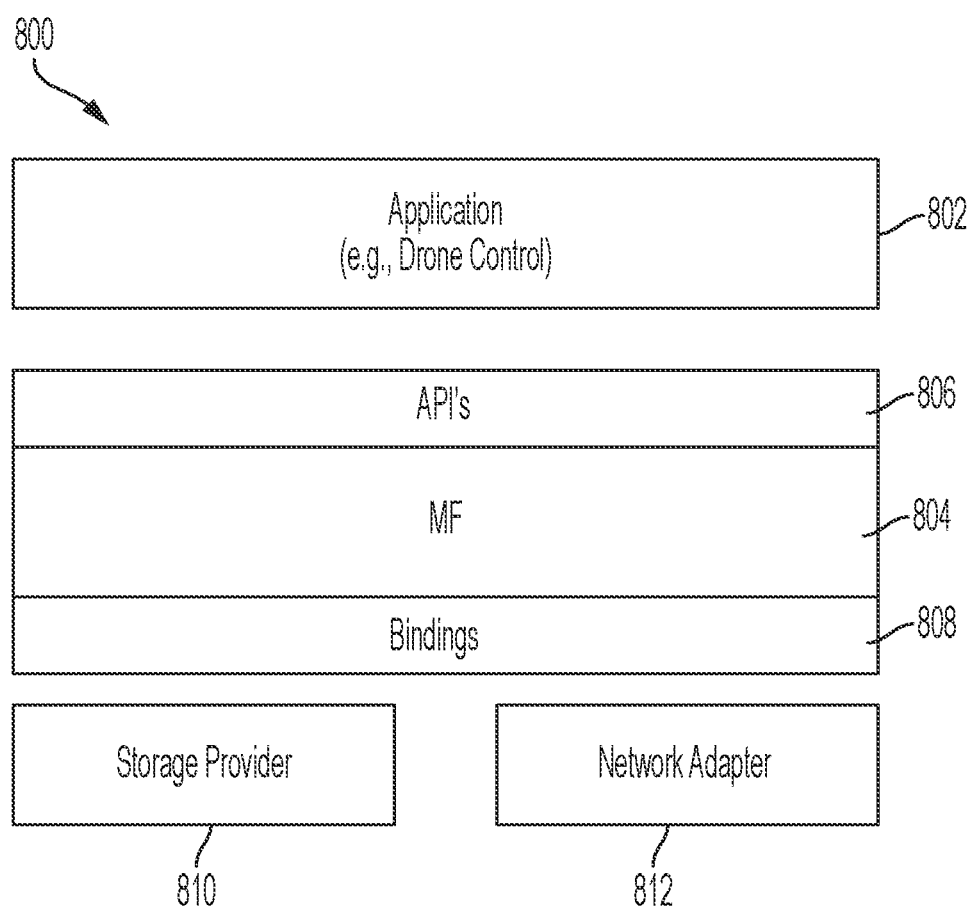
FIG. 8 shows a block diagram for an embedded system embodiment.

FIG. 8 shows a block diagram 800 for an embedded embodiment, referred to as Embedded App. Embedded App in this example is an application layer designed for autonomous sensor platforms like drones or stationary sensing platforms such as in a battlefield or other high stress zones. While in this example, the Embedded App is applied to unmanned vehicles, a person of ordinary skill in the art will appreciate that the application can be embedded in other devices or appliances. The application is designed to interface with these embedded platforms allowing MF control and monitoring of the device. Due to the structure of the MF, the device to have multi-participant interactions and to implement multi-modal interfaces.

For example, a multi-modal interface executing the MF 804 can send commands to a drone as readily interpretable structured messages, which Embedded App interprets and provides to the drone application 802 in its machine language. Further, the drone communicates with external nodes with structured messages, as will be described more particularly below. U.S. patent application Ser. No. 17/460,395, entitled, "System and Methods with a Multimodal Interface for Command and Control (Inputs) and Monitoring (Outputs) of Unmanned Systems," describes a multi-modal interface which can be implemented according to the principles of the invention, and is incorporated by reference herein. Functions 806-812 operate similarly as in embodiments previously described.

In an exemplary embodiment, an embedded system need not include the capability to execute application code. For example, an unmanned vehicle, such as a drone, may only require the capability to interpret and send structured messages according to a workflow. The structured message can carry data which when interpreted by the drone instructs the drone to manipulate its on-board flight control apparatus. Likewise, the drone's on-board capability may generate data, such as location, speed, or data from sensors, which a message framework embedded in a drone may include in a structured message. In such embedded systems, a lightweight version of the message framework excluding the ability to execute programming can be deployed.

In another embodiment related to drones or similar systems, a full or lightweight version of a message framework can be included in the flight controller. In this aspect, the controller can carry out the message translations, state synchronizations and other message framework functions relative to the controller.

The exemplary embodiments use a message centric design. Systems relying on cloud resources as the central authority data and logic are extremely limited in use cases where users must operate without robust cloud connectivity. Systems according to the invention do not rely on a cloud resource, such as a central database, to implement decision logic and to store all state information. While systems according to the invention may have access to cloud resource, the resources provide services, storage, management and the like. Nodes executing the MF according to the invention send and receive messages having the data and the logic to carry out their functions without relying on logic in the cloud.

The exemplary message centric design provides multiple attributes that the exemplary systems utilize advantageously to deliver a robust communication and coordination system even when substantial parts of the system operate off-line. In these embodiments, while a database may be implemented in the cloud, the database does not implement the system logic. On the other hand, the database eventually holds all the data as seen by each node in a workflow, and each node's view of the workflow can be replicated by querying the database. This provides the system with the ability to run analytics for each node and to view each node's actions at any point in the workflow.

Preferably, each node logs each message sent and received, and each decision the node executes within a workflow. The log may be a separate service or the log data may be embedded in messages sent and received in a workflow. If a node is off-line when the node sends a message, receives a message or executes some logic, the events will be captured to a log service in the cloud once the node connects. Eventually, as all off-line nodes participating in a workflow connect to the cloud or hub, the central log service will log all the events occurring in a workflow. Together the log and database can provide the entire state at any point for any node in a workflow.

Structured messaging according to the invention captures data and logic and is preferable to unstructured messaging. For example, natural language messaging relies on exchanging human readable prose in natural language. While such an approach provides ease of use and understanding, unstructured prose also creates constraints and limitations. Among the limitations pertinent to systems include the inability of unmanned vehicles and robots to understand text. These systems rely on a machine language that the drone or robot interprets as a command to execute some function, such as increase rotor speed. Further, where voice processing accuracy is critical, the complexity and processing power required to convert a natural language voice message to an accurate text typically requires on-line resources due to the size of the voice interaction models. Further, non-structured prose is not conducive to embodying logic or state in a readily usable form.

Systems according to the invention implement structured messaging. As would be understood to a person having ordinary skill in the art, structured messages or structured text can implement predefined statements, values, lock for assigning or changing values and the like. In some structured text systems, statements are separated by colons and various symbols are used to indicate how to interpret or act on data in the message. JSON (Java Script Object Notation) is an exemplary structured message specification for human text. JSON is open source and program language independent. More information on structured messages can be found at json.org.

Structured messages are machine readable, consistent and terse. Because structured messages according to the invention embody a schema, the messages can be more easily validated than plain text messages. Further, as will be explained, the structured messages according to the invention assist in user interface generation, enable automation including automated data ingestion, and simplify voice processing.

An illustrative plaint text message such as:
I need a medevac . . . The MIST report follows . . . Mechanism of injury is gunshot wound. Injury is . . . Read back? . . . 9-Line to follows. Location is . . . can be structured as:
{"mist":{mi" "gsw", " " 7, "s"" true, "t": "turn"}} . . .

As will be understood by the skilled artisan, structured message specification includes types. In an exemplary embodiment, Avro can be used for data serialization and deserialization. Avro provides an open standard language neutral schematization useful in structured messaging or streaming. Avro provides data types which can also be used as types for the structured message specification. The type system may also include other simple, compound, logical and defined types. In the medevac example, defined types may include person, resource, drone and manned vehicle. Defined types will typically include contextual relevance for functions like searching and validation, or for implementing rules or heuristics for prioritizing a resource.

Structured messages according to the principles of the invention can include both data and logic. For example, in the medevac example, the request for a helicopter can include data representing location, injury description, blood type, vital statistics and any other data pertinent to the medevac. The message can also include the logic a responding helicopter element must carry out if it receives and responds to the message. For example, a helicopter responding to the medevac may need to receive a destination hospital for transport. The structured message request for medevac delivers this piece of logic to the responding helicopter, which implements the logic and sends its own structured message to hospitals.

Structured messages are implemented within the workflows and the MF for the embodiments of FIGS. 4-8. In an aspect of the invention, structured messages are converted to forms for a user to fill, via the workflow message authoring and other functional blocks of the described embodiments. The forms are presented to the user on a user interface via the workflow message authoring APIs. As such, a node in receipt of a structured message according to the invention can generate a user interface presenting a form for ingesting the values for the message.

The structured message for requesting a medevac using a MIST report, for example, can be used to generate a user interface presenting a form seeking the requested values. The user can use the interface to provide the values for the form from which the structured message is generated. A person having ordinary skill in the art after having read this disclosure will be able to specify a structured messaging schema and data types for a workflow according to the principles of the invention and implement the messaging schema in a communications network.

Workflows embody the unit of logical coordination to accomplish the system tasks. A workflow can bundle the messages with the logic required to accomplish the task. The medevac request scenario embodies a workflow. It bundles the structured messages, data types, fields and the other elements with the logic necessary to summon the helicopter and deliver the injured party to the hospital. Once the request message is sent, the logic component defines that the next task is to query for the resource. The logic would further require selection of the delivery hospital. The execution of the logic is illustrated with respect to the use case scenario of FIG. 3.

A system according to the principles of the invention allows for the creation of custom workflows. A "workflow" definition includes the structure, fields, and data types of each message that can be used in the scope of this workflow. It also includes presentation meta-data, used as hints by the system to generate user interfaces (on screen, voice controlled, or otherwise) for the creation of each message type. An exemplary workflow according to the invention will include the messages that can be sent or received, the meta data for creating user interfaces on nodes, any executable code for execution on a node and other data necessary to carry out the workflow in the system. A workflow is bundled in a file and can be code signed for security. Nodes having the message framework will be able to process workflow files.

Mutability meta-data describes which message fields can be mutated after the message is transmitted and by which algorithm conflicts are resolved. A software module (plugin) that allows for custom behavior, message validation, or other workflow specific logic can be specified in the workflow and implemented in the structured message specification. The workflow also defines any accessory assets such as images, language models, or structured data.

A workflow can include a manifest file specification ensuring a distributed workflow has all of its constituent components, has not been tampered with, and originated at a trusted origin.

This is accomplished via code signing. The manifest includes checksums for every associated file. The manifest document is signed by a trusted origin using asymmetric key encryption. The public side of the key is published via standard TLS certificate. This provides readily implementable security where necessary.

Workflows enable the "packagization" of the communications needed to perform a specific task or sets of tasks for the desired action. The desired action can be the illustrative medevac, another coordinated rescue, deployment of resources for law enforcement, commercial tasks like administering a fleet or delivering goods or running an e-commerce store. The tasks that may be coordinated using a system according to the invention is not limited, and the invention can entail systems implementing workflow designs and message frameworks according to the invention.

An exemplary workflow definition includes:
The valid message types, their wire schema, and presentation details
The roles for participating nodes
Logic for state transitions
Manifest of assets (Machine Learning models, WASM modules, etc)

In an exemplary system, workflows can be implemented using a web assembly (WASM) runtime engine. WASM is an open-source structured stack machine paradigm developed by the World Wide Web Consortium standards organization. A description of WASM and its applicability in standalone environments can be found at www.webassembly.org. Among the desirable features, WASM environments are sandboxed, meaning that the code executing within the WASM module can be accessed from the outside or access outside modules other than permitted by the developer, as shown in the embodiments of FIGS. 4-8. WASM supports readily developable API's and other interfaces. Moreover, WASM modules support many programming languages, making it adaptable outside of browser environments.

In this aspect of the exemplary system, the WASM runtime plugins implemented on the nodes of the exemplary system execute the message oriented, distributed workflow logic according to the principles of the invention. A structured message according to the invention includes data types and data that act as logic instructions when executed within the WASM module. This overcomes the shortcomings of instantiating the logic within permanently installed applications and permits the transfer of logic as data to nodes resourcing a workflow. As explained above, lightweight or embedded versions may, but need not, include the ability to instantiate executables or updateable workflows.

Figure 9:
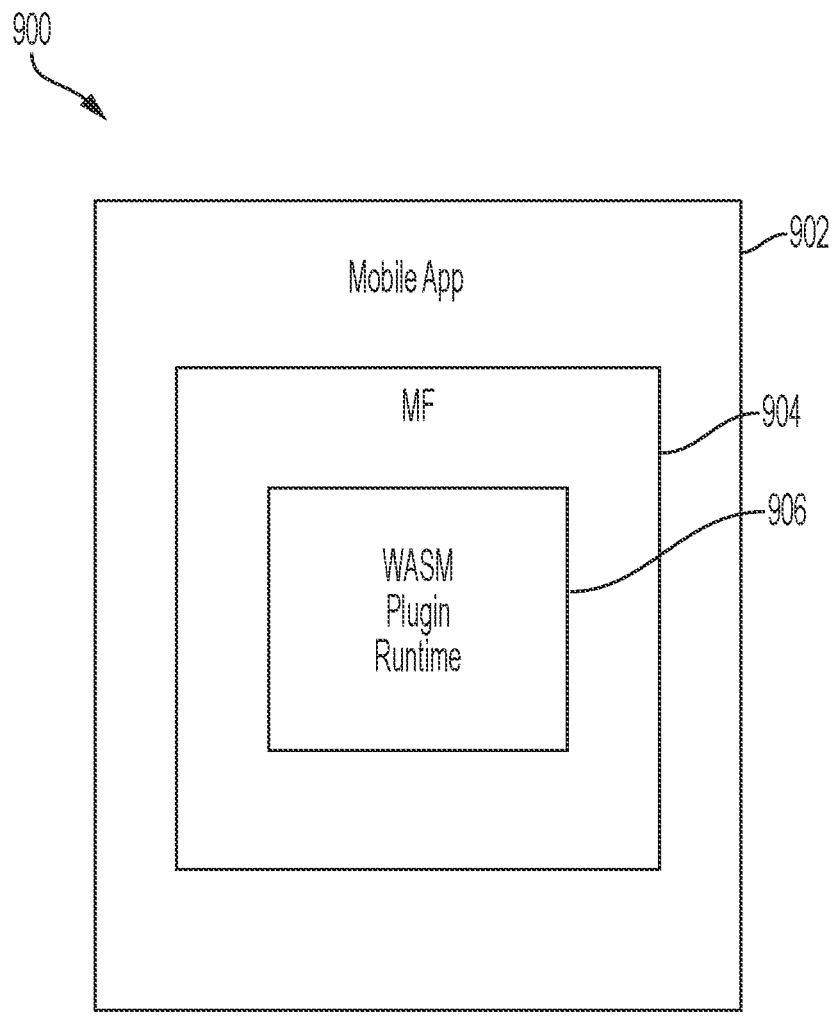
FIG. 9 shows a block diagram of a web assembly deployment in a mobile.

FIG. 9 shows a block diagram 900 of a deployment of a mobile embodiment 902 on an Android device. At the application layer, an Android app 902 resides on the device. The application 902 executes a message framework 904 as discussed with reference to FIGS. 3-8. A WASM runtime plugin 906 implemented in, for example, the Rust programming language, executes in the MF 904.

As previously explained, the WASM permits easily developable interfaces, which in the exemplary embodiment includes interfacing with the device UI. In the described medevac example, each node receiving a resource request can have a WASM module and configurations that will permit the structured message to instance an interface on the user's device. One helicopter may be implementing a heads-up-display with voice interface. The user's device is configured to interpret the structured message and instantiate a voice interaction for responding to the request. Another helicopter may have a co-pilot operating a tablet interface with preference to respond with touch. The same structured message may instantiate a touch interface to respond to the request in a form displayed on the tablet.

Advantageously, the logic of the workflow can be distributed along with the data the logic will act upon. Application code can also be distributed within the structured message. A person having ordinary skill in the art having read this disclosure will understand how to distribute workflow data and logic to be executed in a WASM module on a device. Such a workflow can execute without an installation package. The just described aspect of the exemplary system overcomes the constraints of installing logic in the form of applications separate from the data of an execution for each workflow. In this embodiment, state and logic can be distributed together.

The result is a new class of off-line application that can be implemented in any system that can benefit from message-oriented logic flow. The system becomes dynamic, as nodes and resources can join or leave a workflow as tasks may require. The system is mutable in the sense that users can instance interfaces based on local configurations and devices as such devices implement the requirements of a structured message. Workflows can be designed to execute tasks in ways unachievable in static cloud-based systems. A person of ordinary skill in the art having read this disclosure will understand how to implement systems according to this new paradigm of design and execution to accomplish workflows.

A system according to the principles of the invention ingests data and context. As shown in FIGS. 3-8, the MF includes interfaces that can be used to ingest data from various context and data providers. A user interface form generated from a structured message provides one such scenario. In another context, options are provided to a user via an interface based on proximity or location data. For example, a user may be assembling a team for an operation such as a rescue. The user interface screen may provide a form for the user to input team data, such as names, title and skill specialties. In addition, the user interface may use sensor data to provide the user with available persons in proximity which the user can select them to the team.

In another aspect, location data can be ingested in different contexts. A user's GPS sensor can readily provide location data. In another example, if GPS location data is not available, the user can be presented a map on which the user can select location such as by tapping. Alternatively, this data may be available via another application on the user's device so long as the application is configured to share this data.

In another aspect of the invention, data can be provided from external sources during times of connectivity to the cloud. For example, where systems having robust resource data already exist, the system according to the invention can query the existing system for data. In the medical rescue example, hospitals have existing systems with accessible data. The system according to the invention can be configured to query the hospital systems for the hospital's capacity and available resources, such as supplies and beds.

A person having ordinary skill in the art after reading this disclosure will understand that other methods of ingesting data and context to the system can be used without departing from the invention. The WASM implementation provides the tools necessary to develop APIs to data sources, as will be appreciated by the skilled artisan after having read this disclosure. Context data inputs implemented in the workflow systems of the described embodiments advantageously provide for dynamically generated coordinated systems that are optimized for the time and situation of the workflow execution. In a rescue workflow, for example, the context data provider together with the workflow design result in the optimal distribution of resources that may be available at the time of execution.

Form filling according to the invention uses structured message and contextual data ingesting. A user requesting a resource, for example a medevac, prepares to send the request via a structured message. The values and attributes of the structured message are used to create a user interface such as a form to be filled in the message authoring subsystem as described with reference to FIGS. 4-8. The message authoring subsystem also embodies the user interface functionality, which in an exemplary embodiment includes multiple modes such as voice and touch. A context system understands the message authoring requirements and also has a catalog of context data providers. The context data providers can be a sensor on the user mobile, an external system, data in another app running on the mobile, data in other devices proximate the user device as previously explained. These data sources can be made available via plugins to the system of the invention.

The context system receives the query for data from the message authoring system and decides which available data providers may hold relevant data. The context system formulates queries to these providers and imports the responsive data from the providers. The context system may also apply rules or heuristics to either select data for the form to be filled or to provide selections to the user for form filling or both.

Structured messaging and form filling according to the principles of the invention also provides advantages for voice interaction model implementation in a multi-modal interface. The vocabulary can be simplified and optimized for the structured message values and the user interface authoring. This reduces the size of the model preferable to a size that can be accommodated locally.

Systems according to the invention therefore remove heretofore constraints on design. It is no longer a requirement to identify specific resources in a design. Instead, the workflow is designed and the resource types are identified. The specific resources that will make up the system at execution time will be allocated on the fly.

Figure 10:
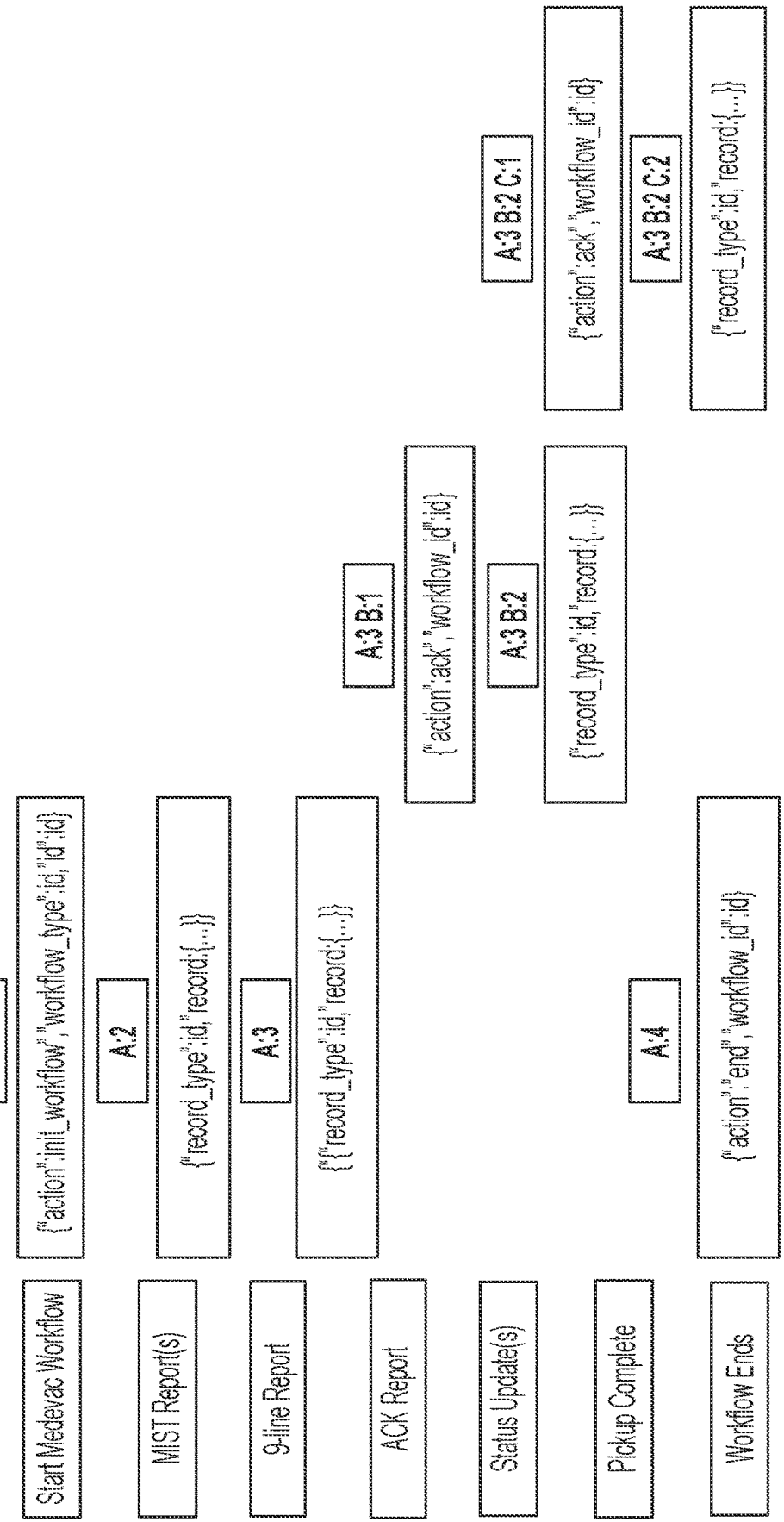
FIG. 10 shows an exemplary workflow.

FIG. 10 shows an exemplary workflow 1000. The events 1002-1014 in the workflow relate to a simple medevac use case. The workflow is started 1002 at node A. Each event at each node is counted 1016-1030 for use in synchronization, which is explained below. Nodes A, B and C are running an application that includes the message framework, as explained with reference to FIGS. 2-9. The message framework generates and interprets structured messages 1032-1046. The structured messages include a workflow identification, actions, record identifications and logic as previously explained. Workflows can be designed and defined within the application, as explained with reference to the Cloud App embodiment.

The workflow of FIG. 10 maintains data state consistency across the nodes. State consistency refers to maintaining consistent data across all devices, applications and transactions in a network. The failure to maintain data consistency between devices can result in catastrophic error. In networks providing for consistent cloud connectivity, data state consistency can be maintained on one or more databases in the cloud. State changes refer to data changes made to devices, applications or transactions in the network. There are many ways known to maintain state in a network where devices are consistently on-line. Technologies also exist to track or update state where there is a brief failure of connectivity. In these scenarios, a database for storing or tracking state is considered the authority concerning any conflict that may exist between or among devices. Where any device or application needs to resolve data state, the cloud provides an authority.

A system according to the principles of the invention provides for state consistency where devices and transactions occur off-line. In distributed computing, a conflict-free replicated data type (CRDT) is a data structure replicable across multiple computers in a network. The replicas are independently and concurrently updatable without coordination between the replicas. CRDT's have the property that it is possible to resolve inconsistencies. See, Shapiro, Marc; Preguica, Nuno; Baquero, Carlos; Zawirski, Marek (2011). "Conflict-Free Replicated Data Types", Stabilization, Safety, and Security of Distributed Systems (PDF). Lecture Notes in Computer Science, 6976. Grenoble, France: Springer Berlin Heidelberg. pp. 386-400, See also, Conflict-free Replicated Data Type, Wikipedia, https://en.wikipedia.org/wiki/Conflict-free_replicated_data_type#cite_note-2011CRDT-1.

CRDTs have the following properties when implemented according to the principles of the invention. Any two nodes receiving the same set of messages at least once will have the same state. Nodes in the network with partial data will eventually converge to the same state as messages are passed from node to node. This message paradigm also allows for out of order communication of packets and duplication of packets, but eventually ensures a true state of all packets throughout all nodes. CRDTs are a class of data type that exists for counters, sets, graphs, etc. All of JSON can be modeled with CRDTs. State synchronization can be implemented by transmitting full data state or by transmitting mutations to state.

Both are supported in CRDT based synchronization. The exemplary system provides for mutation-based synchronization. In the message framework the CRDTs rely upon Vector Clocks. A vector clock as is known to persons with ordinary skill in the art can be used for determining the partial ordering of events in a distributed system and detecting causality violations. A vector clock of a system of N processes is an array/vector of N logical clocks, one clock per process; a local "largest possible values" copy of the global clock-array is kept in each process.

The Vector Clocks according to the principles of the invention can be implemented as follows:
1. Initially all clocks are zero.
2. Each time a process experiences an internal event, it increments its own logical clock in the vector by one. For instance, upon an event at process i, it updates $VC\_i[i] \leftarrow VC\_i[i]+1$
3. Each time a process sends a message, it increments its own logical clock in the vector by one (as in the step above, but not twice for the same event) and then the message piggybacks a copy of its own vector.

4. Each time a process receives a message, it increments its own logical clock in the vector by one and updates each element in its vector by taking the maximum of the value in its own vector clock and the value in the vector in the received message (for every element).

As can be seen with reference to FIG. 10, each node maintains a vector clock that increments with each message received. A synchronization according to the invention can be instigated when any node makes a sync request of another node using a sync request message. The request indicates the status of the vector clock. The responding node sends in the response a representation of its vector clock and the messages the requesting node lacks. Because of the properties of CRDTs, once the nodes exchange messages at least once, they can confirm that they have the same state. For purposes of illustration, the vector clock is the logical clock for the node and the CRDT ensures synchronizing nodes have the same data.

In another exemplary workflow, a user can implement a multi-modal interface according to the invention. Consider a single user desiring drone support for a mission requiring the user to maintain contact with specialized equipment while manipulating a drone. The user according to the invention can create a workflow that inputs waypoints for the drone, allows the drone to proceed from waypoint to waypoint according to command inputs, and causes the drone to execute a drop or take photos. The user designs the workflow file which can be provided to the mobile device and optionally the specialized equipment and drone. (Alternatively, the specialized equipment and drone can communicate with mobile device executing the message framework such that the drone receives commands in its machine language).

The user instantiates the workflow from the mobile device. As previously explained, the workflow specification and structured message exchanges permits touch inputs on a mobile device, voice inputs, to the mobile device and button inputs on the specialized equipment. In the workflow, the user inputs waypoints via the touch interface, directs the drone to proceed to each waypoint, and provides for the user to cause the drone to make a drop or take a photo or some other action as specified in the workflow in response to button presses on the specialized equipment. In another aspect, the workflow can specify logic for the drone to execute. In yet another aspect, the drone includes a web assembly module and the executables and be delivered to the drone.

The exemplary system relates to a MEDEVAC use-case scenario or workflow; however, a person of ordinary skill in the art after reading this disclosure will appreciate the applicability to other use cases. A person of ordinary skill in the art having read this disclosure will understand that the invention is not limited to the disclosed embodiments or use cases, but other encompasses systems embodying the principles of workflow design, state maintenance, dynamic allocation of resources, workflow design paradigms, contextual data ingestion, dynamic interface rendering and the methods of coordinated systems the principles entail.

What is claimed is:

1. A mobile device comprising:
   a communications subsystem operable to establish communications over a communication channel, the communications subsystem including a network adapter operable to facilitate data communication over the communication channel according to selected network protocols;
   a multi-modal user interface including at least a voice mode and a touch mode;
   at least one context data provider;
   a processor operable to execute a special purpose application including a message framework including
   a web assembly module operable to interpret structured messages according to a workflow specification and to execute instructions included in the structured messages, the structured messages optionally including data according to simple data types and logic types and the instructions; and,
   a plurality of application interfaces, including a workflow message interface operable to interface data from structured messages to user interface modules capable of providing elements on the multi-modal interface, and a context interface operable to interface data with a context provider module, the context provider module operable to provide data from selected ones of the at least one context data provider; and,
   a storage device operable to store data and applications including the special purpose application.

2. The mobile device of claim 1 wherein the workflow specification includes data type definitions and logical relationships for the instructions.

3. The mobile device of claim 1 wherein the at least one context data provider includes a position sensor.

4. The mobile device of claim 1 wherein the at least one context data provider includes an optical sensing device.

5. The mobile device of claim 1 comprising at least one other special purpose application wherein the at least one context data provider includes the at least one other special purpose application.

6. The mobile device of claim 1 further comprising an operating system wherein the message framework application includes interfaces operable to interact with operating system services.

7. The mobile device of claim 1 wherein the structured messages include data types and instructions for communicating commands entered via the multi-modal interface to an unmanned vehicle via the communication channel.

8. The mobile device of claim 1 wherein the storage device stores user configurations and wherein a received structured message causes the web assembly module to provide data to the user interface modules and the user interface module provides the elements on the multi-modal interface according to the user configurations.

9. The mobile device of claim 8 wherein the elements on the multi-modal interface include a form-fill element.

10. The mobile device of claim 9 wherein the form-fill element comports with the workflow specification.

11. The mobile device of claim 1 wherein the message framework executes an off-line synchronization process with at least one other device.

12. The mobile device of claim 11 wherein the synchronization process causes the mobile device to exchange conflict-free replicated data type structures with the at least one other device.

13. The mobile device of claim 1 wherein the message framework includes a storage engine operable to read from the storage device and to write to the storage device.

14. The mobile device of claim 1 wherein the structured messages include data types and instructions for communicating commands entered via the multi-modal interface to an allocable resource via the communication channel.

15. The mobile device of claim 1 wherein the mobile device executes service processes including authentication and authorization services accessible to the mobile device via the communication channel.

16. The mobile device of claim 1 wherein the mobile device executes service processes including authentication and authorization services accessible to the mobile device via the communication channel.

17. The mobile device of claim 1 wherein the mobile device receives state synchronization data via the communication channel and executes a state synchronization process.

18. The mobile device of claim 1 wherein the mobile device comprises a wearable.

\* \* \* \* \*